(12) United States Patent
Stradinger et al.

(10) Patent No.: US 8,443,833 B2
(45) Date of Patent: May 21, 2013

(54) CHECK VALVE

(75) Inventors: Jay Stradinger, Enfield, CT (US); Kevin Arthur Roberg, Norwich, CT (US); Rosanna Catricala Glynn, Cromwell, CT (US)

(73) Assignee: Hamilton Sundtrand Corporation, Windsor Locks, CT (US)

( * ) Notice: Subject to any disclaimer, the term of this patent is extended or adjusted under 35 U.S.C. 154(b) by 34 days.

(21) Appl. No.: 13/081,764

(22) Filed: Apr. 7, 2011

(65) Prior Publication Data

US 2012/0255631 A1 Oct. 11, 2012

(51) Int. Cl.
*F16K 21/10* (2006.01)
*F16K 15/03* (2006.01)

(52) U.S. Cl.
USPC .................................. 137/514; 137/527.8

(58) Field of Classification Search
USPC .............. 137/514, 514.3, 527, 527.8
See application file for complete search history.

(56) References Cited

U.S. PATENT DOCUMENTS

| 2,078,375 | A | * | 4/1937 | Eldridge ................ 137/514 |
| 3,106,220 | A | | 10/1963 | Hose |
| 3,422,843 | A | * | 1/1969 | Blackman et al. ........... 137/514 |
| 3,926,216 | A | * | 12/1975 | Rulcker ................ 137/527.8 |
| 4,098,085 | A | * | 7/1978 | McDowell ............... 137/527 |
| 4,286,621 | A | * | 9/1981 | Glahn ................... 137/514 |
| 4,437,485 | A | | 3/1984 | Goodman |
| 4,854,344 | A | * | 8/1989 | Schnipke ................ 251/54 |
| 6,250,894 | B1 | | 6/2001 | Dyer et al. |
| 6,926,490 | B2 | | 8/2005 | McAuliffe et al. |
| 7,422,029 | B2 | * | 9/2008 | Denike et al. ............. 137/514 |
| 7,695,355 | B2 | | 4/2010 | Doherty |
| 2008/0072973 | A1 | * | 3/2008 | McGonigle et al. ......... 137/514 |
| 2008/0078459 | A1 | * | 4/2008 | Warriner et al. .......... 137/514 |

FOREIGN PATENT DOCUMENTS

| GB | 1008879 | | 11/1965 | |
| JP | 55155970 | A * | 12/1980 | ............... 137/514 |
| JP | 57177466 | A * | 11/1982 | ............... 137/514 |

OTHER PUBLICATIONS

European Search Report dated Jun. 15, 2012 for Application No. 12162780.6-2422.

* cited by examiner

*Primary Examiner* — John Rivell
(74) *Attorney, Agent, or Firm* — Cantor Colburn LLP

(57) ABSTRACT

A valve is provided. The valve includes a flapper member. A barrel is coupled to the flapper member, the barrel having an interior volume and at least one movable vane within the interior volume. A shaft member is rotationally coupled to the barrel, the barrel having at least one stationary vane disposed within the interior volume.

1 Claim, 5 Drawing Sheets

CHECK VALVE

BACKGROUND OF THE INVENTION

The subject matter disclosed herein relates to a check valve and in particular to a check valve having a damper to reduce or prevent damage to the valve due to high speed closure rates.

Flapper or check valves are used in a wide variety of applications such as in air handling units for example. The valve operates on pressure differential and is arranged to open when the fluid is flowing in the desired direction and automatically close if the pressure differential falls below a desired level or if the flow of the fluid reverses. These check valves assist in preventing contamination of the upstream system if the flow of fluid reverses, or prevent the reversal of flow from a pressurized space if leakage occurs upstream from the valve.

A check valve includes a flapper member that rotates between an open position and a closed position against a valve seat. In an instance where the valve closes due to a leakage or failure of an upstream conduit or component, the flow of fluid from a pressurized space (e.g. an aircraft cabin) may result in the flapper member closing at high speeds against the valve seat. The high-speed impact of the flapper member against the valve seat may result over time in a damaged valve seat, valve hinge or housing. As a result, these valves may have to be periodically inspected and replaced or redundant valving arrangements may need to be incorporated into the system, which increases operating and maintenance costs.

Accordingly, while existing check valves are suitable for their intended purposes the need for improvement remains, particularly in the providing of a check valve with a reduced flapper closure speed and improved reliability.

BRIEF DESCRIPTION OF THE INVENTION

According to one aspect of the invention a valve is provided. The valve includes a flapper member and a barrel coupled to the flapper member. The barrel has an interior volume and at least one movable vane within the interior volume. A shaft is rotationally coupled to the barrel, the barrel having at least one stationary vane disposed within the interior volume.

According to another aspect of the invention, another valve is provided. The valve includes a housing having an inlet and an outlet. A valve seat is arranged adjacent the inlet. A flapper member is movable between a first position in contact with the valve seat and a second position. A barrel is coupled to the flapper member and rotationally coupled to the housing, the barrel having a first end and a second end and an interior surface, wherein the first end, the second end and the interior surface define a first volume. At least one movable vane is disposed within the first volume. At least one stationary vane is operably coupled to the housing and disposed within the first volume, wherein the at least one stationary vane, the at least one movable vane and the interior surface define a second volume and a pressure within the second volume increases as the flapper member moves from the second position to the first position.

According to yet another aspect of the invention, yet another valve is provided. A housing is provided having an inlet, an outlet and a valve seat disposed between the inlet and the outlet. A flapper member is movable between a first position in contact with the valve seat and a second position. A hinge member is coupled to the flapper member and rotationally coupled to the housing, the hinge member having an interior volume and a first vane disposed within the interior volume. A second vane is disposed within the interior volume adjacent the first vane and operably fixed relative to the housing, the second vane cooperating with the interior volume and the first vane to define a first enclosed space, the first enclosed space having a first volume when the flapper member is in the first position and a second volume when the flapper member is in the second position.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
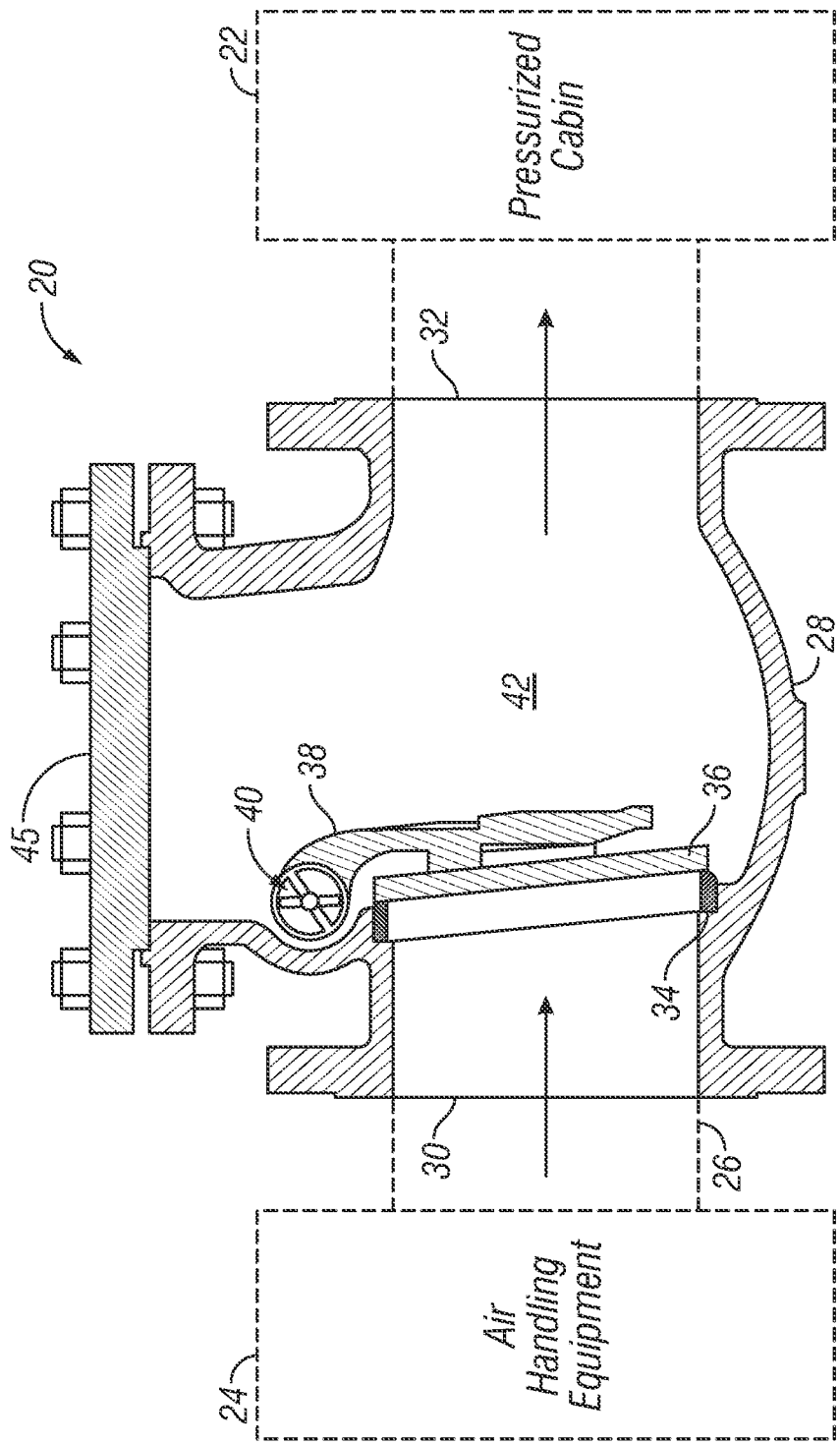
FIG. 1 is a side view partially in section of a check valve in accordance with an embodiment of the invention.

Check valves are used in a variety of applications to allow fluid, such as air to flow in only one direction. Under predetermined conditions, such as a pressure differential outside of a desired level, the valve automatically closes. One embodiment of a check valve 20 is shown in FIG. 1. In the exemplary embodiment, the check valve 20 is disposed between a pressurize space 22, such as an aircraft cabin for example, and an air handling equipment 24. The air handling equipment 24 may include pumps, blowers, filters, valves, heaters, chillers and the like for conditioning the air for use in the pressurized cabin 22 for example. The check valve 20 may be connected to the air handling equipment 24 by one or more conduits 26. It should be appreciated that if the air handling equipment 24 or the conduits 26 develop a leak, the pressurization of the pressurized space 22 may be greater than the conduits 26 causing a reversal of airflow.

The check valve 20 includes a housing 28 having an inlet 30 and an outlet 32. Adjacent the inlet 30, is a valve seat 34 and a rotatable flapper member 36. The flapper member 36 is movable between a closed position against the valve seat 34 and an open position. In the exemplary embodiment, the flapper member 36 may rotate to a partially open position, such as about 77 degrees for example. The flapper member 36 is connected to the housing 28 by a hinge 38. As will be discussed in more detail below, the hinge 38 includes a damper 40 that slows the closing speed of the flapper member 36. The amount of damping provided is dependent on the closing speed, with a faster closing speed receiving additional damping while a slow closing speed resulting in little or no damping. Arranged between the flapper member 36 and the outlet 32 is a chamber 42 that provides clearance for the flapper member 36 to open. The housing 28 may also include one or more ports or covers 45 that allow service personnel access to the interior of the check valve 20 for inspection and maintenance.

The check valve 20 is arranged to receive air from the air handling equipment 24 via inlet 30. The air passes through the chamber 42 and out through the outlet 32 to the pressurized cabin 22. In the exemplary embodiment, the flapper member 36 opens in response to air flowing from the inlet 30 to the outlet 32 and automatically closes in the event there is any negative pressure differential between pressurized cabin 22 and the conduit 26. In other embodiments, the check valve 20 may be arranged to have a bias that prevents the opening of the flapper member 36 until the pressure in the conduit 26 is at a desired pressure level above the pressurized cabin 22.

Figure 2:
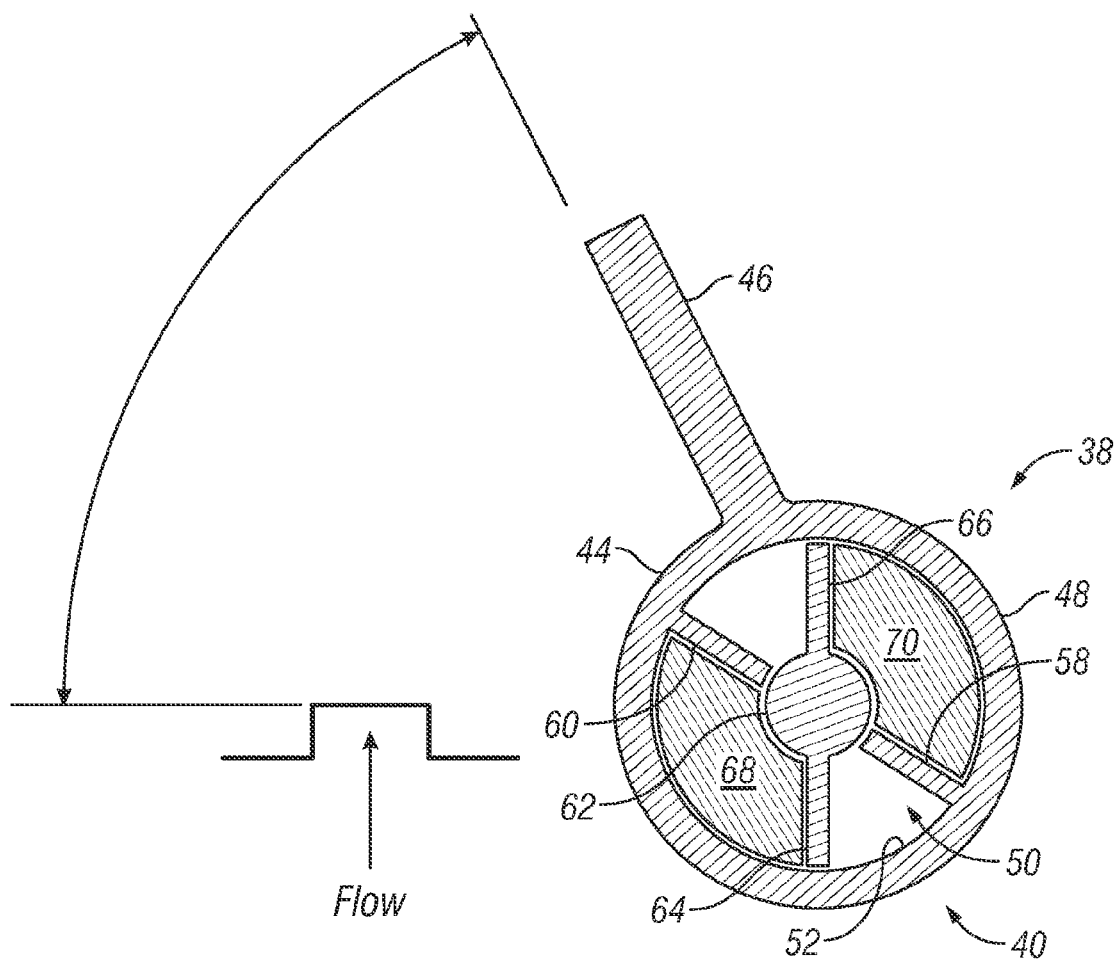
FIG. 2 is a partial side view of a hinge and damper arrangement for use with the check valve of FIG. 1 in an open position.
Figure 3:
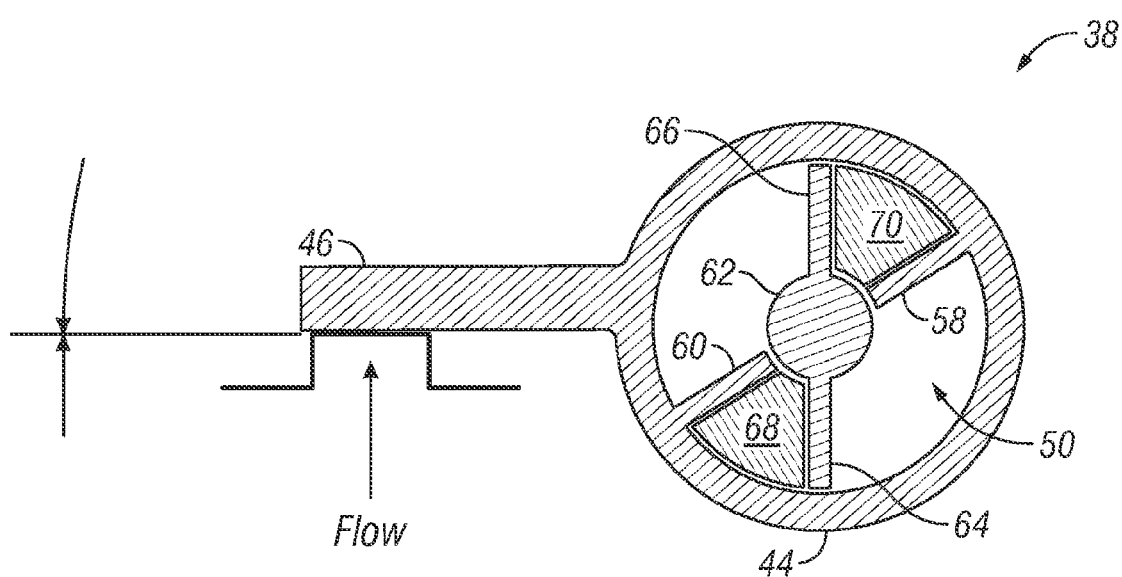
FIG. 3 is a partial side view of a hinge and damper arrangement for use with the check valve of FIG. 1 in a closed position.
Figure 4:
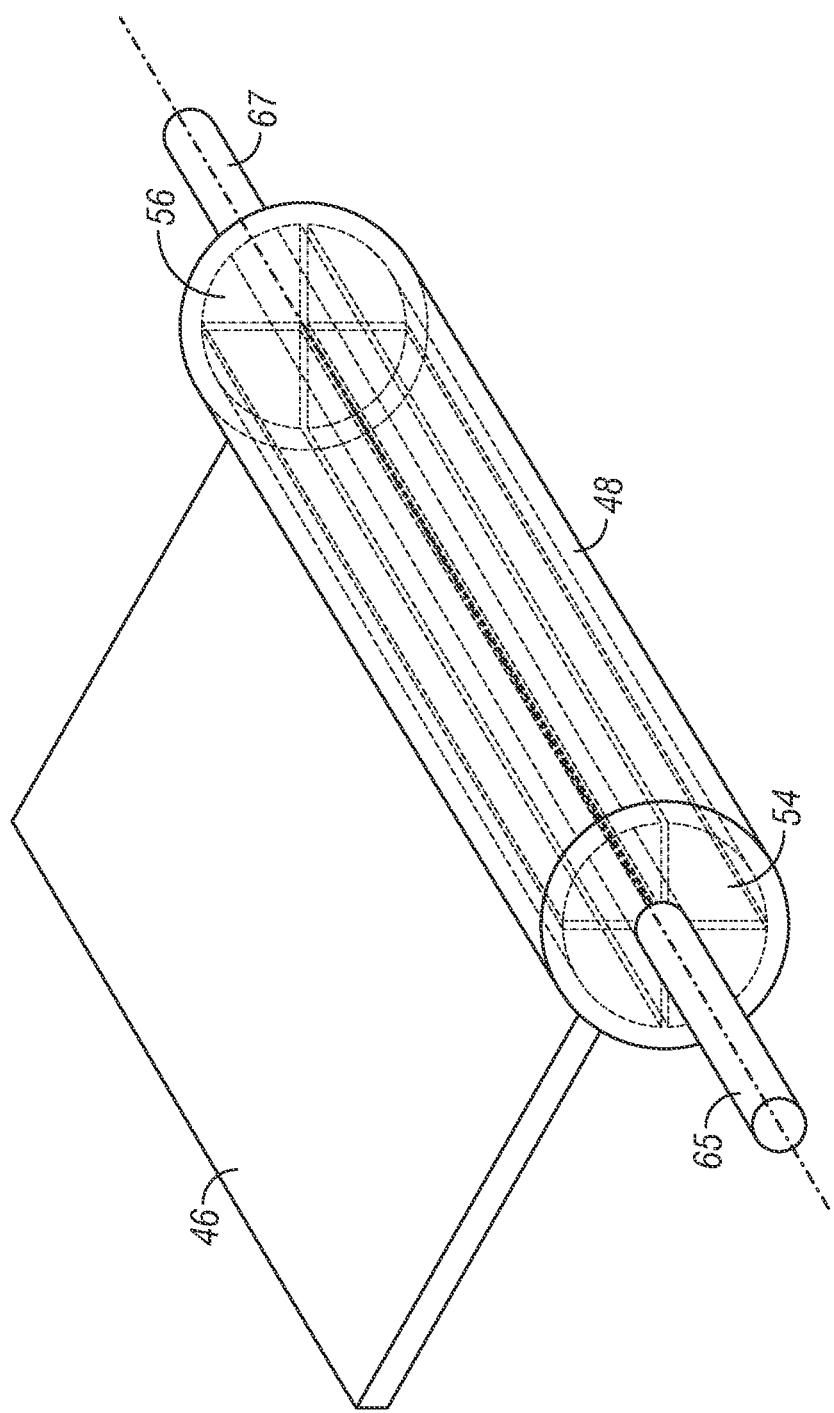
FIG. 4 is a partial perspective view of the hinge and damper arrangement of FIG. 2 and FIG. 3; and, FIG. 5 is a partial side view of another hinge and damper arrangement for use with the check valve of FIG. 1.

Referring now to FIGS. 2-4, an embodiment is shown of the hinge 38 having a damper 40. In the exemplary embodiment, the hinge 38 includes a barrel 44. The barrel 44 has a planar projection 46 that extends radially from an outer surface 48. The planar projection 46 couples to the flapper member 36. The barrel 44 includes an interior volume 50 that is defined by an interior surface 52 of the barrel 44 and the ends 54, 56 of the barrel 44. In one embodiment, the ends 54, 56 may include a hinge shaft bearing (not shown). Projecting radially inward from the interior surface 52 area is a first movable vane 58 and a second movable vane 60. In one embodiment, the hinge 38 and the flapper member 36 are formed from as a single integrated member. In the exemplary embodiment, the barrel 44 is made from an aluminum extrusion that creates a near-net shape. Also, it should be appreciated that additional vanes may be added to increase the damping force.

The vanes 58, 60 are separated by a gap that is sized to receive a shaft member 62. The shaft member 62 extends through the interior volume 50 and extends past the ends 54, 56. The shaft member 62 includes end portions 65, 67 that are fixedly coupled to the housing 28. As will be discussed in more detail below, a clearance may be formed between the end portions 65, 67 and the ends 54, 56 to control the leakage of air from the interior volume 50. In the exemplary embodiment, the fit between the shaft member 62 and the tip of the vanes 58, 60 is controlled by a sharp edge similar to a labyrinth seal to allow a fixed flow of air within the interior volume 50.

Extending radially outward from the shaft member 62 are a first stationary vane 64 and a second stationary vane 66. The stationary vanes 64, 66 are arranged within the interior volume 50 between the ends 54, 56. Similar to the vanes 58, 60, a clearance is formed between the tip of the vanes 64, 66 and the interior surface 52. In the exemplary embodiment, the shaft member 62 and vanes 64, 66 are fabricated by brazing the vane to a split shaft followed by grinding to maintain concentricity. The braze material will fill undesired voids and clearances while maintaining shaft strength in a vibratory environment. In another embodiments, the shaft-vane member may be formed using other methods such as but not limited to machining from a single bar-stock or electrical discharge machining (EDM) for example.

In the exemplary embodiment, the vanes 58, 60, 64, 66, the interior surface 52 and the ends 54, 56 cooperate to form a first enclosed space 68 and a second enclosed space 70 within the interior volume 50. It should be appreciated that since the vanes 64, 66 are stationary relative to the housing 28 and the vanes 58, 60 rotate with the flapper member 36, the volume of the enclosed spaces 68, 70 will decrease in size as the flapper member 36 moves from an open position (FIG. 2) to a closed position (FIG. 3). As the vanes 58, 60 rotate, the pressure within the enclosed spaces 68, 70 will increase in accordance with Boyles Law, namely $P_1V_1T_1=P_2V_2T_2$. This increase in pressure slows or dampens the rate of speed that the flapper member 36 closes. However, the amount of damping is speed dependent since for a given pressure differential between the enclosed spaced 68, 70 and the remainder of the interior volume 50 there will be a fixed fluid flow rate past the tips of vanes 58, 60, 64, 66. For high closure speeds, the pressure within the enclosed spaces will be higher thus increasing the damping effect. When the flapper member 36 rotates at a lower speed, the flow of air about the vanes will reduce the amount of pressure level increase within the enclosed spaces and allow the flapper member 36 to close completely on the valve seat 34. It should be appreciated that the speed sensitive damper 40 provides advantages in reducing flapper member 36 closing speeds to decrease the risk of damage to the flapper or the valve seat 34 while still allowing the closure of the valve under lower flapper speeds.

Figure 5:
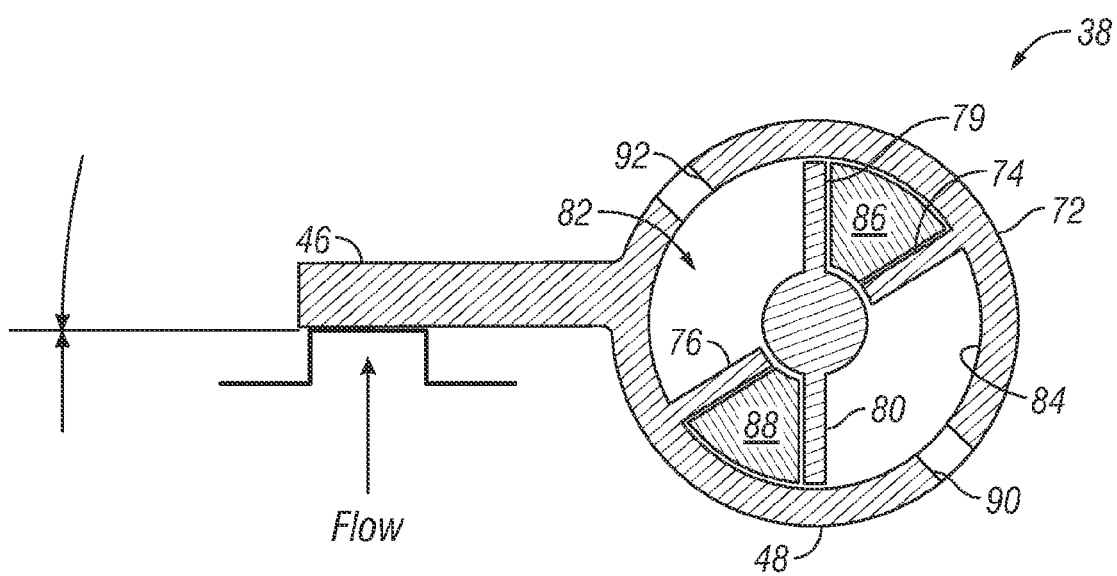

Referring now to FIG. 5, another embodiment is shown of a hinge 38. In this embodiment, the barrel 72 includes a first movable vane 74 and a second movable vane 76. A shaft 79 is disposed in a gap between the vanes 74, 76. The shaft 78 includes a first stationary vane 78 and a second stationary vane 80. The vanes 74, 76, 78, 80 are disposed within an interior volume 82 that is defined by an interior surface 84 and the ends 54, 56. The vanes 74, 76, 78, 80 cooperate with the interior surface 84 to define enclosed spaces 86, 88. As discussed above, the pressure increases within these enclosed spaces 86, 88 to due to a resistance of flow as the vanes form a decreasing volume of trapped fluid causing an increase in pressure.

In this embodiment, the barrel 72 includes a first hole 90 and a second hole 92 that are disposed between the interior volume 82 and an area external to the hinge 38. The holes 90, 92 provide for self-compensation of the hinge 38. It should be appreciated that while the holes 90, 92 are illustrated as extending radially through the outer surface 48 of the barrel 72, the holes may also be located on the ends 54, 56. Further, the holes 90, 92 may fluidly couple the interior volume 50 with the chamber 42, or the external environment outside of the check valve 20.

In one embodiment, the interior volume of the barrel may be filled with a gas other than air or a liquid fluid to provide the desired level of damping.

It should be appreciated that while embodiments herein refer to a pressurized cabin and air handling equipment, the claimed invention should not be so limited and the claimed invention may be used in any application where the slowing of high-speed flapper member movement is desired.

Embodiments of the present invention incorporate a speed sensitive damper into a check valve. The damper reduces the risk of damage due to high closure speeds of the flapper member. The damper further provides high damping at high speeds and low damping at low speeds to reduce the risk of the valve not closing at lower flapper closure speeds.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. The valve comprising:
   a flapper member;
   a barrel coupled to the flapper member, the barrel having an interior volume and at least one movable vane within the interior volume;
   a shaft rotationally coupled to the barrel, the barrel having at least one stationary vane disposed within the interior volume, the at least one stationary vane and the at least one movable vane defining at least one enclosed space within the interior volume;
   wherein the at least one movable vane and the shaft define a gap therebetween, the gap defining a fluid flow path having a fixed flow between the at least one enclosed space and the remainder of the interior volume as the flapper member moves between a closed position and an open position;
   wherein the barrel further includes at least one hole fluidly coupled between an exterior of the valve and the remainder of the interior volume when in the closed position.

* * * * *